US008514332B2

(12) United States Patent
Zhong

(10) Patent No.: US 8,514,332 B2
(45) Date of Patent: *Aug. 20, 2013

(54) METHOD AND SYSTEM FOR NON-LINEAR BLENDING IN MOTION-BASED VIDEO PROCESSING

(75) Inventor: Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 2603 days.

This patent is subject to a terminal disclaimer.

(21) Appl. No.: 11/314,690

(22) Filed: Dec. 20, 2005

(65) Prior Publication Data

US 2007/0139560 A1    Jun. 21, 2007

(51) Int. Cl.
*H04N 9/74* (2006.01)
(52) U.S. Cl.
USPC .............................. 348/584; 348/701; 348/607
(58) Field of Classification Search
USPC ................. 348/597, 451–452, 609–610, 620, 348/607, 699–701; 382/261
See application file for complete search history.

(56) References Cited

U.S. PATENT DOCUMENTS

| 5,500,685 | A * | 3/1996 | Kokaram ....................... 348/620 |
| 6,335,990 | B1 * | 1/2002 | Chen et al. ..................... 382/261 |
| 7,110,455 | B2 * | 9/2006 | Wu et al. .................. 375/240.16 |
| 7,391,933 | B2 * | 6/2008 | Wang et al. ................... 382/300 |
| 7,551,232 | B2 * | 6/2009 | Winger et al. ................ 348/607 |
| 7,573,530 | B2 * | 8/2009 | Zhong ........................... 348/452 |
| 2002/0027610 | A1 * | 3/2002 | Jiang et al. .................... 348/448 |

* cited by examiner

Primary Examiner — Trang U Tran
(74) Attorney, Agent, or Firm — Thomas | Horstemeyer, LLP.

(57) ABSTRACT

A method and system for non-linear blending in motion-based video processing is described. Aspects of a system for processing images may include circuitry within a chip that computes a blending factor, with a nonlinear relationship to a motion metric, which defines an amount of motion between a current video picture, and at least one preceding video picture and/or at least one subsequent video picture. At least one pixel in the current video picture may be adjusted based on the computed blending factor. Aspects of a method for processing images may include computing a blending factor, with a nonlinear relationship to a motion metric, which defines an amount of motion between a current video picture, and at least one preceding video picture and/or at least one subsequent video picture. At least one pixel in the current video picture may be adjusted based on the computed blending factor.

20 Claims, 10 Drawing Sheets

METHOD AND SYSTEM FOR NON-LINEAR BLENDING IN MOTION-BASED VIDEO PROCESSING

CROSS-REFERENCE TO RELATED APPLICATIONS/INCORPORATION BY REFERENCE

This application makes reference to:
U.S. patent application Ser. No. 11/314,679, filed Dec. 20, 2005;
U.S. patent application Ser. No. 11/313,592, filed Dec. 20, 2005;
U.S. patent application Ser. No. 11/314,680, filed Dec. 20, 2005; and
U.S. patent application Ser. No. 11/313,871, filed Dec. 20, 2005, and issued as U.S. Pat. No. 7,573,530 on Aug. 11, 2009.

Each of the above stated applications is hereby incorporated by reference in its entirety.

FIELD OF THE INVENTION

Certain embodiments of the invention relate to processing of video signals. More specifically, certain embodiments of the invention relate to a method and system for non-linear blending in motion-based video processing.

BACKGROUND OF THE INVENTION

Some video processing tasks, such as noise reduction for TV video signals, de-interlacing (or interlace to progressive conversion), and 3D combing for Y/C separation, usually involve operations on pixels in consecutive pictures (frames or fields). For example, in analog noise reduction (NR), the pixel in consideration (denoted as the current pixel) in the current picture is filtered together with certain pixels in the previous pictures and/or next pictures (of the same parity) in the temporal order. The next pictures are usually unprocessed. Some or all the previous pictures can be previously processed pictures, in which case the filtering is IIR in nature. If none of the previous pictures is processed yet, the filtering is FIR in nature. The filtered result is usually blended with the current un-processed pixel to get the output pixel value. The decision on how much each part contributes to the final output is critical in giving good results. Some algorithms make the decision on how the filtered result is blended with the unfiltered pixel according to motion information. The principle is to have the filtered result to contribute a larger proportion to the blend when there is little or no motion at the pixel position, and contribute smaller proportion to the blend when there is a larger amount of motion at the pixel position. Inappropriate blending would result in artifacts of motion blur, motion trails, jitters, wobblings, or inadequate noise removal. The measure of the amount of motion can be done in different forms. The mean absolute difference (MAD) between neighboring pictures over a neighborhood of the pixel in consideration has been widely used.

In motion-compensation-based temporal filtering (MCTF) for noise reduction, similar principles apply. The locations of corresponding pixels in different pictures should be aligned based on the motion vectors (MVs) obtained through a motion estimation process when the MVs represent meaningful motion of the picture content. Prior to motion compensation, at least two of the corresponding pixels in different pictures may have different coordinates within the respective pictures.

In de-interlacing, each field picture is converted to a frame picture. An absent pixel between two vertically neighboring existing pixels is generated. If there is no motion between the current field and its neighboring field(s), the pixel(s) that co-located with the absent pixel can be used to generate the absent pixel. This operation is called the temporal interpolation (TI), and is also traditionally called weave. Weave has the benefit of keeping the generated frame picture sharp as it utilizes original pixel values to increase picture resolution. In some instances, use of TI may result in bad weaves, which would cause a type of video distortion referred to as false motion effect.

If there is significant motion of the picture content, the neighboring existing pixels in the same field can be used to generate the absent pixel. This operation is called spatial interpolation (SI). SI is also traditionally called a bob. Bobbing is bad-weave free, but may result in video frames that look soft or blurry. When the motion is measured as a fuzzy indicator, the weave and bob results are blended, according to a blending factor derived from the motion metric.

Similar principles can be applied to 3D combing algorithms for Y/C (luma-chroma) separation of NTSC or PAL signals. In an NTSC signal, for example, the collocated pixels in two consecutive video frames are of opposite phase for the color sub-carrier. The color signals would cancel out and only the luma component would remain if the corresponding pixels were added together when there was no motion detected at a pixel position. The color would also mostly cancel out when there was little detected motion. When there is significant motion, this inter-frame operation cannot be reliably used to cancel out the chroma. Instead, intra-frame operations should be used. And blending of the results from the inter-frame operations and intra-frame operations can be based on a blending factor according to the motion metric.

The most traditional method for deriving the blending factor usually involves mapping the value of the motion metric to the value of the blending factor, linearly or piece-wise linearly. In many cases, the linear, or piece-wise linear, mapping lacks sensitivity to motion. This may result in slow reaction to increased motion in the picture content. The slow reaction may produce disturbing artifacts in processed video pictures such as motion blur, motion trails, motion aliasing or incorrect luma/chroma separation. Methods such as controlling the blending through linear mapping based on quantized values of the motion metric have also been proposed. Utilizing quantized values of the motion metric could also result in banding artifacts, in addition to other artifacts mentioned above.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for non-linear blending in motion-based video processing, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and/or system for non-linear blending in motion-based video processing. Blending may comprise computing a value of a pixel in a current output video picture based on contributions from a plurality of input video pictures. The contributions may be controlled based on a blending factor. Blending may provide improved video quality in the designated video processing task, such as analog noise reduction, de-interlacing, or 3D combing. In a motion detection based video processing system, the value of the blending factor may adapt dynamically to the detected motion among a sequence of video pictures. Detected motion may be estimated based on a computed motion metric. In various embodiments of the invention, the relationship between blending factor and the motion metric may be adapted to provide improved video processing such as noise reduction performance in video systems in comparison to some conventional algorithms.

Certain embodiments of the invention may be found in a system and/or method for video noise reduction by blended finite impulse response (FIR) and infinite impulse response (IIR) filtering. A filtering mode may be selected to generate noise-reduced pixels based on FIR filtering, IIR filtering, or a blend of FIR/IIR filtering. Blending a current pixel and an FIR-filtered current pixel based on an FIR blending parameter may generate a first blended current pixel. The FIR filtering may be based on the current pixel, a previous collocated pixel and a next collocated pixel. Blending the current pixel and an IIR-filtered current pixel based on an IIR blending parameter may generate a second blended current pixel. Blending the first blended current pixel and the second blended current pixel based on an FIR/IIR blending parameter may dynamically generate a blended output pixel. The blending parameters may be dynamically modified based on a motion metric parameter.

Figure 1:
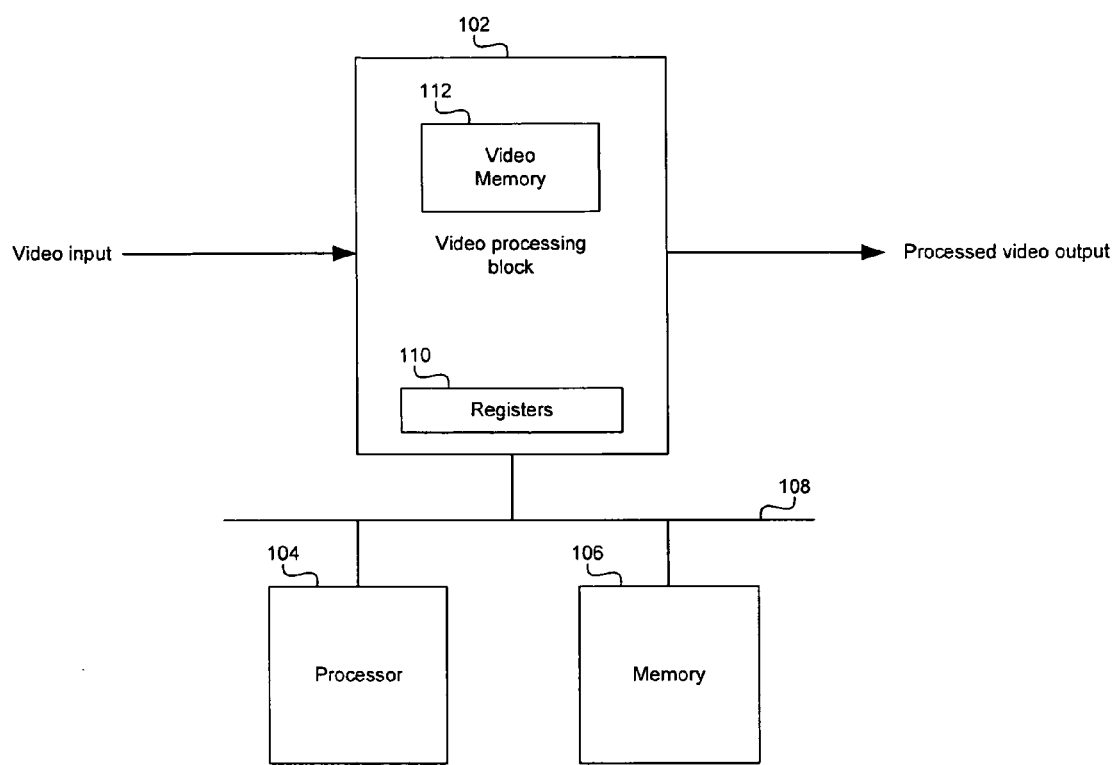
FIG. 1 is a block diagram of an exemplary video processing system, which may be utilized in connection with an embodiment of the invention.

FIG. 1 is a block diagram of an exemplary video processing system, which may be utilized in connection with an embodiment of the invention. Referring to FIG. 1 there is shown a video processing block 102, a processor 104, system memory 106, and a system bus 108. The video processing block 102 may comprise registers 110 and video memory 112.

The processor 104 may comprise suitable logic, circuitry and/or code that may be adapted to process information and/or data associated with the processing of video signals. The processor 104 may, for example, determine values for parameters that may be stored in registers 110 to control the operation of the video processing block 102. The system memory 106 may comprise suitable logic, circuitry and/or code that may be utilized to store data and/or control information that may be utilized in at least a portion of the operation of the processor 104 and/or video processing block 102. The system bus 108 may comprise a medium by which information may be exchanged between the video processing block 102, the processor 104, and/or the system memory 106.

The video processing block 102 may receive video input. The video input may comprise a video signal that contains information from a plurality of video pictures. A video picture may comprise a field picture or a frame picture. A frame picture may comprise a plurality of pixels that is contained in a plurality of field pictures, for example. For example, a frame picture may comprise a plurality of pixels arranged as H lines and W pixels in each line. The lines may be numbered, 0, 1 . . . H−2, H−1. An upper field picture, or top field picture, may comprise a plurality of pixels arranged as approximately H/2 lines and W pixels in each line. The upper field picture may comprise pixels corresponding to lines 0, 2, 4 . . . H−2 from the frame picture. A lower field picture, or bottom field picture, may comprise a plurality of pixels arranged as approximately H/2 lines and W pixels in each line. The lower field picture may comprise pixels corresponding to lines 1, 3, 5 . . . H−1 from the frame picture. The frame picture may comprise the pixels contained collectively in the upper field picture and the lower field picture. The upper field and lower field pictures may form an interlaced representation of the frame picture.

The video processing block 102 may perform any of a variety of video processing tasks on the video input. As a result, the video processing block 102 may adjust at least one value of one or more pixels in a received video picture to generate a processed video output. A pixel may comprise a brightness Y (luma) value, or a pixel may comprise a Y value and color difference values red minus luma (R−Y, or U) or chroma red (Cr), and blue minus luma (B−Y, or V), or chroma blue (Cb). An analog video signal that comprises Y, R−Y, and B−Y information may be referred to as a YUV signal. Alternatively, digital video version of a YUV signal may be referred to as a YCbCr signal. In some representations, the Cb and Cr may be represented collectively as chroma (C) and the corresponding video signal referred to as comprising luminance and chroma (Y/C) information.

Examples of video processing tasks that may be performed by the video processing block 102 may comprise noise reduction for television signals, de-interlacing, 3 dimensional (3D) comb filtering, and motion-compensation-based temporal filtering (MCTF). De-interlacing may be utilized to transform a field picture, for example an upper field picture, into a frame picture. In one aspect of a de-interlacing operation, for example when motion is detected among a series of video pictures, pixels in the same upper field picture or lower field picture may be utilized to interpolate subsequent pixels to transform the field picture into a frame picture. The adjusting of one or more pixels based on pixels in a filtered video output based on information contained in the same video input picture may be referred to as spatial interpolation (SI). When little or no motion is detected, de-interlacing may comprise, for example, interpolating a value of a pixel in a current upper field video picture based on a pixel value of a corresponding preceding lower field video picture and a pixel value of a corresponding subsequent lower field picture. This may be referred to as temporal interpolation (TI).

3D comb filtering, or 3D combing, may be utilized to separate Y and C information in a composite video signal. 3D combing may adjust at least one value of a pixel contained in a current video picture based on information contained in the current video picture and at least one preceding video picture and/or at least one subsequent video picture, especially when there is little or no motion. The adjusting of one or more pixels in a current video picture based on information contained in the current video input picture and at least one preceding video input picture and/or at least one subsequent video input picture may be referred to as temporal processing. 3D combing may also comprise adjusting a value of a pixel in a current video picture based on a value of a corresponding one or more pixels that are proximately located within the current video picture, especially when there is motion. This adjusting may be referred to as spatial processing. 3D comb filtering may utilize spatial processing and/or temporal processing.

MCTF is a type of temporal interpolation in which a location of a current pixel in a current video picture may be different from a location of a corresponding subsequent pixel in a subsequent video picture. The location of the current pixel in the current video picture may be different from a location of a corresponding preceding pixel in a preceding video picture. The location of the current pixel and a computed motion vector (MV) may be utilized to determine the location of the corresponding subsequent pixel. The location of the current pixel and a computed MV may be utilized to determine the location of the corresponding preceding pixel. Steps associated with MCTF video processing may comprise adjusting at least one value of a pixel contained in a current video picture based on information contained in the current video picture and at least one preceding video picture and/or at least one subsequent video picture.

The video processing block 102 may access to pixel information contained in a current, preceding and/or subsequent video picture data that may have been fetched from system memory 106 to video memory 112. The information may be subsequently used during video processing operations. The video memory 112 may also be utilized to store pixel information that comprises intermediate processing results.

The registers 110 may store information that is utilized to control video processing tasks performed by the video processing block 102. For example, the registers 110 may be utilized to store configuration information that selects a video processing task to be performed by the video processing block 102. The registers 110 may, for example, be utilized to store parameter information that determines scale factors that may be applied when processing video input and/or intermediate results.

In operation, the video processing block 102, the processor 104, and the system memory 106 may be coupled to the system bus 108. The system memory 106 may be utilized to store configuration and/or parameter information, a portion of which may be stored in the registers 110 within the video processing block 102, for example. The system memory 106 may also be utilized to store executable code that may control the operation of the processor 104. The processor 104 may execute the stored executable code that may cause the processor 104 to perform steps that result in the selection of configuration and/or parameter information that may be stored in the system memory 106. The selected configuration and/or parameter information may subsequently be retrieved from the system memory 106 and written to the registers 110.

Figure 2:
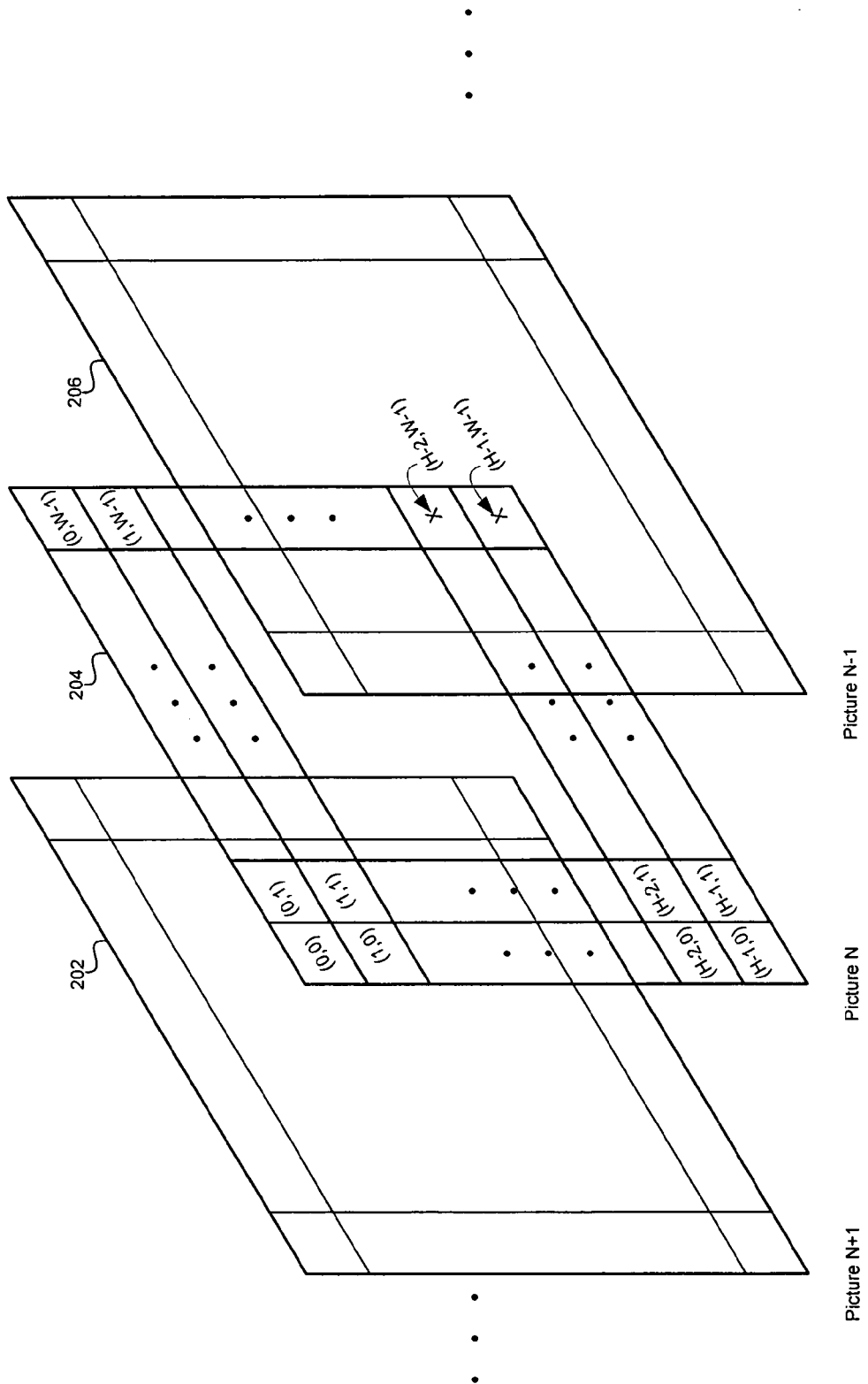
FIG. 2 is a diagram illustrating exemplary consecutive video pictures, in connection with an embodiment of the invention.

FIG. 2 is a diagram illustrating exemplary consecutive video pictures, in connection with an embodiment of the invention. Referring to FIG. 2, there is shown a plurality of video pictures 202, 204, and 206. Each of the video pictures may comprise a plurality of pixel arranged as H lines with W pixels per line. The lines may be identified by line numbers comprising 0, 1 ... H−2, H−1, for example. The pixels within a line may be identified by column numbers comprising 0, 1, W−1, for example. An individual pixel may be indicated based on a (row, column) tuple. For example, a pixel in the upper left corner of the video picture 204 may be indicated by the tuple (0,0). Each of the video pictures may be received at distinct time instants. For example, video picture 204 may represent a current video picture that was received at a time instant identified by t=N. Video picture 206 may represent a preceding video picture that was received at a time instant identified by t=N−1. Video picture 202 may represent a subsequent video picture that was received at a time instant identified by t=N+1.

Some television broadcast standards, such as those based on the recommendations of the National Broadcast Standards Committee (NTSC), may specify a rate at which video pictures may be transmitted. The rate may specify a time interval between video pictures 202, 204 and 206. Other television broadcast standards may include Phase Alternating Line (PAL) and Système Électronique pour Couleur avec Mémoire (SECAM), each which may specify a rate at which video pictures may be transmitted. The transmission of video field pictures may be referred to as an interlace scan transmission, or interlaced video. The transmission of video frame pictures may be referred to as progressive scan transmission, or progressive video.

Various embodiments of the invention may comprise a method and a system for noise reduction (NR) in a received video input. The invention may not be limited to NR applications and various embodiments may also be utilized in other video processing applications, such as de-interlacing and 3D combing, for example. In NR, at least one value of a pixel in a current video picture may be combined with a corresponding at least one value of a pixel in one or more preceding video pictures and/or a corresponding at least one value of a pixel in one or more subsequent video pictures. The current video picture and the one or more preceding and/or subsequent video pictures may be of the same type, i.e. of the same field polarity. For example, in the NR processing task, the current video picture and one or more preceding and/or subsequent video pictures may be upper field pictures. Similarly, the current video picture and one or more preceding and/or subsequent video pictures may be lower field pictures. Alternately, the current video picture and one or more preceding and/or subsequent video pictures may be frame pictures. Furthermore, NR may comprise operations on a common pixel value type among the pixels processed. For example, when processing YUV or YCbCr signals, NR may comprise operations on Y values among the pixel values being processed. Separately, Cb or B−Y pixel values may be processed, and subsequently Cr or R−Y pixel values may be processed. NR processing may result in an adjustment in at least one pixel value of the current video picture as a result of the operations.

The combining of at least one value of a pixel in a current video picture with a corresponding at least one value of a pixel in one or more preceding video pictures and a corresponding at least one value of a pixel in one or more subsequent video pictures may be referred to as finite impulse response (FIR) filtering. A filtered video output resulting from FIR filtering may be referred to as an FIR filtered video picture. The combining of at least one value of a pixel in a current video picture with a corresponding at least one value of a pixel in one or more preceding filtered output video pictures may be referred to as infinite impulse response (IIR) filtering. A filtered-video output resulting from IIR filtering may be referred to as an IIR filtered video picture.

The subsequent combining of at least one value of a pixel in a current video picture with a corresponding at least one value of a pixel in a filtered video picture may be referred to as blending. Blending may be utilized to generate a blended video picture. The extent to which pixels in a current video picture may be combined with pixels in a filtered video picture may be based on a blending factor. The subsequent combining of at least one value of a pixel in a current video picture with a corresponding at least one value of a pixel in an FIR filtered video picture may be referred to as FIR blending. The extent to which pixels in a current video picture may be combined with pixels in an FIR filtered video picture may be based on an FIR blending factor. FIR blending may be utilized to generate an FIR blended video picture. FIR blending may be referred to as an FIR NR mode.

The subsequent combining of at least one value of a pixel in a current video picture with a corresponding at least one value of a pixel in an IIR filtered video picture may be referred to as IIR blending. The extent to which pixels in a current video picture may be combined with pixels in an IIR filtered video picture may be based on an IIR blending factor. IIR blending may be utilized to generate an IIR blended video picture. IIR blending may be referred to as an IIR NR mode.

The combining of at least one value of a pixel in an FIR blended video picture and a corresponding at least one value of a pixel in an IIR blended video picture may be referred to as adaptive blending. The extent to which pixels in an FIR blended video picture may be combined with pixels in an IIR blended video picture may be based on an adaptive blending factor. Adaptive blending may be utilized to generate an adaptive blended video picture. Adaptive blending may be referred to as an adaptive blending mode.

A blending factor, such as an FIR blending factor, IIR blending factor, or adaptive blending factor, may be computed based on motion detection in a current video picture and one or more subsequent and/or preceding video pictures of a common type. Motion may be detected in an FIR NR mode if at least one value of a pixel in a current video picture is different from a corresponding at least one value of a pixel in at least one preceding video picture. This difference may be referred to as a leading difference. Motion may also be detected in an FIR NR mode if at least one value of a pixel in a current video picture is different from a corresponding at least one value of a pixel in at least one subsequent video picture. This difference may be referred to as a trailing difference. Thus, motion may be detected relative to a current pixel in a current video picture by adding an absolute value of the corresponding leading difference and an absolute value of the corresponding trailing difference.

Determination of motion between video pictures based on a single pixel may be unreliable due to noise, or other errors that affect a single pixel in a proximal area within the video picture, which may render a misleading indication of motion. Consequently, a motion metric may be derived by computing a sum over a plurality of proximately located pixels within the current video picture and corresponding preceding and/or subsequent video pictures. The sum may be normalized by dividing by a normalization factor. The plurality of proximately located pixels may comprise a transform window. A size of a transform window may be indicated by the number of rows and the number of columns contained in the transform window. A transform window may also be associated with a normalization factor. A normalization factor may be derived by multiplying the number of rows by the number of columns in the transform window. For example, a transform window that comprises 3 rows and 5 columns may be referred to as a 3×5 transform window. The normalization factor may be equal to 15. For example, in the video picture 204, the pixels (0,0), (0,1), (0,2), (1,0), (1,1), (1,2) (2,0), (2,1) and (2,2) may comprise a 3×3 transform window, with a corresponding normalization factor equal to 9. The neighborhood of the transform window may be defined by the location of one of the pixels within the transform window. For example, the neighborhood for the 3×3 transform window may be defined by a pixel in the center. In this case, for the transform window comprising the pixels indicated above, the neighborhood may be defined by the pixel located at (1,1). Consequently, a motion metric for a 3×3 transform window may be computed relative to a current pixel in a current video picture by deriving a sum based on adding an absolute value of the corresponding leading difference and an absolute value of the corresponding trailing difference for each pixel in the transform window, and subsequently dividing the sum by a normalization factor of 9. The plurality of current pixels may be located at (0,0), (0,1), (0,2), (1,0), (1,1), (1,2) (2,0), (2,1) and (2,2), within the current video picture for example. The plurality of preceding pixels may be located at (0,0), (0,1), (0,2), (1,0), (1,1), (1,2) (2,0), (2,1) and (2,2) within each of the one or more preceding video pictures. The plurality of subsequent pixels may be located at (0,0), (0,1), (0,2), (1,0), (1,1), (1,2) (2,0), (2,1) and (2,2) within each of the one or more subsequent video pictures. An FIR motion metric may be computed for FIR NR mode, an IIR motion metric may be computed for IIR NR mode, and an adaptive motion metric may be computed for an adaptive blending mode.

Various embodiments of the invention may comprise a method and a system that computes a blending factor, comprising an FIR blending factor, an IIR blending factor and an adaptive blending factor, based on a corresponding motion metric, comprising an FIR motion metric, an IIR motion metric, and an adaptive motion metric. For example, an FIR blending factor may be computed based on an FIR motion metric. In some conventional methods, the blending factor may be linearly proportional to the corresponding motion metric. For example:

$$C\_\alpha_{FIR} = c_1 + c_2 C\_MM_{FIR} \qquad \text{equation [1]}$$

where $C\_\alpha_{FIR}$ may represent a conventionally computed FIR blending factor, $C\_MM_{FIR}$ may represent a conventionally computed FIR motion metric, and $c_1$ and $c_2$ may represent constant values. By contrast, in various embodiments of the invention, there may be a nonlinear relationship between the blending factor, and the corresponding motion metric. A blending NR mode that utilizes a blending factor whose value is based on a motion metric may be referred to as a motion adaptive NR mode.

Figure 3:
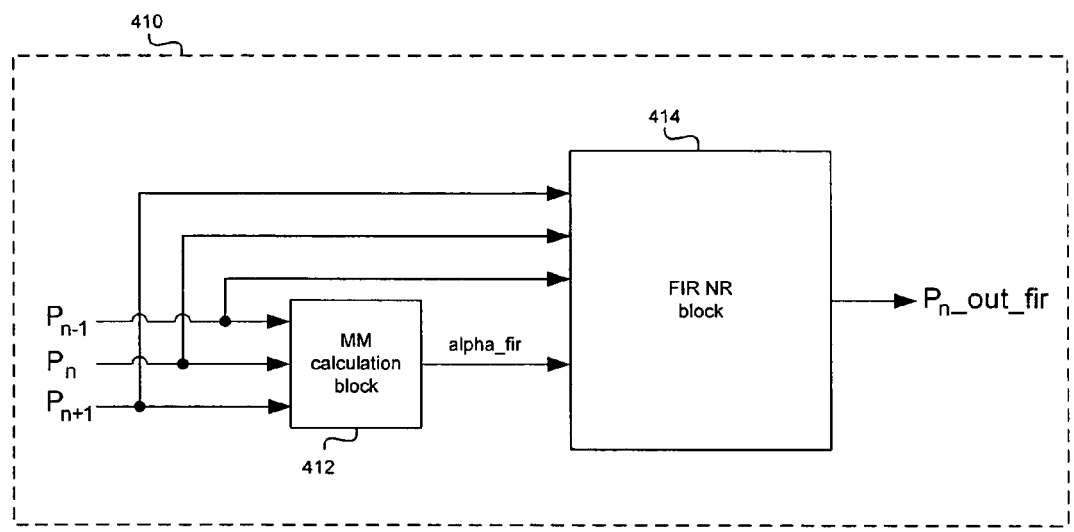
FIG. 3 is a block diagram of an exemplary finite impulse response (FIR) blending system operating in FIR noise reduction mode, in accordance with an embodiment of the invention.

FIG. 3 is a block diagram of an exemplary finite impulse response (FIR) blending system operating in FIR noise reduction mode, in accordance with an embodiment of the invention. Referring to FIG. 3 there is shown an FIR blending system 410 that may comprise a motion metric (MM) calculation block 412 and an FIR noise reduction (FIR NR) block 414. The FIR blending system 410 may be referred to as a motion adaptive FIR NR mode system. The FIR blending system 410 may be implemented as a portion of the video processing block 102 in FIG. 1, for example. The MM calculation block 412 may comprise suitable logic, circuitry, and/or code that may be adapted to calculate an FIR MM. The MM calculation block 412 may utilize the calculated FIR MM to compute an FIR blending factor, $\alpha_{FIR}$.

The MM calculation block 412 may compute an FIR MM. For example, an FIR MM based on pixel values P may be computed in accordance with the following expression:

$$MM(x, y) = \frac{1}{h \cdot w} \sum_{i=-\frac{H-1}{2}}^{\frac{H-1}{2}} \sum_{j=-\frac{W-1}{2}}^{\frac{W-1}{2}} [|P_n(i+x, j+y) - P_{n-1}(i+x, j+y)| + |P_n(i+x, j+y) - P_{n+1}(i+x, j+y)|]$$

equation [2]

where the tuple (x,y) may define the neighborhood of the corresponding transform window, MM (x,y) may represent the motion metric computed for the pixel (x,y) at the neighborhood, w may represent a number of pixels in a row within the transform window, h may represent a number of pixels in a column within the transform window, H may represent the number of rows in the neighborhood, W may represent the number of pixels in a row in the neighborhood, and the indexes i and j may represent pixel offsets in the vertical and horizontal directions, respectively, relative to the pixel located at (x, y). For example, the indexes i and j may be added to x and y respectively to indicate a location of a pixel within the window for which the MM is being computed in equation [2]. For example, the pixel neighborhood (0,0), (0,1), (0,2), (1,0), (1,1), (1,2) (2,0), (2,1) and (2,2) may be defined for a neighborhood at (1,1) with H=3 and W=w=3. $P_n(i+x,j+y)$ may represent a value of a pixel located at (i+x, j+y) in a current video picture 204, $P_{n-1}(i+x,j+y)$ may represent a value of a corresponding pixel located at (i+x,j+y) in a preceding video picture 206, and $P_n(i+x,j+y)$ may represent a value of a pixel located at (i+x,j+y) in a subsequent video picture 202. The current, preceding and subsequent video pictures may be of the same type in equation [2]. For example, the current, preceding and subsequent video pictures may each be upper field video pictures, lower field video pictures, or frame video pictures.

A pixel value P may represent a luma pixel value, a Cb or color difference B−Y pixel value, or a Cr or color difference R−Y pixel value. In each case a corresponding $MM_{luma}$, $MM_{Cb}$, or $MM_{Cr}$ may be computed. A final motion metric may be computed based on a weighted average sum of the respective motion metrics. For example, for an FIR NR mode, an $MM_{FIR}$ may be computed by the MM calculation block 412 according to the following expression:

$$MM_{FIR} = c_0 MM_{luma} + c_1 MM_{Cb} + c_2 MM_{Cr}$$

equation [3]

and $$c_0 + c_1 + c_2 = 1$$

equation [4]

where $c_0$, $c_1$, and $C_2$ may represent constants that may be stored in the registers 110 in FIG. 1, for example.

A neighborhood size, such as represented by the number of rows, H, and the number of columns W, may be determined by considering the effect of the movement of thin objects, for example a thin edge in an image, and by considering the efficacy of a neighborhood of the given size in reducing or "smoothing out" noise. Exemplary neighborhood sizes may comprise 3 rows and 3 columns, or 3×3, 5 rows and 3 columns, 5×3, 3×5, 7×3, 5×5, 7×5, and 7×7.

The computation for the luma motion metric $MM_{luma}$ may differ from the computation for the chroma motion metrics $MM_{Cb}$ and $MM_{Cr}$ because the number of pixels in a video picture comprising luma pixel values may be greater than the number of pixels in the video picture comprising chroma pixel values. This may be referred to as chroma subsampling in a YCbCr signal. In chroma subsampling, a portion of the pixels within a pixel neighborhood that may be sampled for luma pixel values may not be sampled for Cb or Cr pixel values. Pixels that may not be sampled for chroma pixel values may be considered to represent Cb and Cr values equal to 0.

Figure 4:
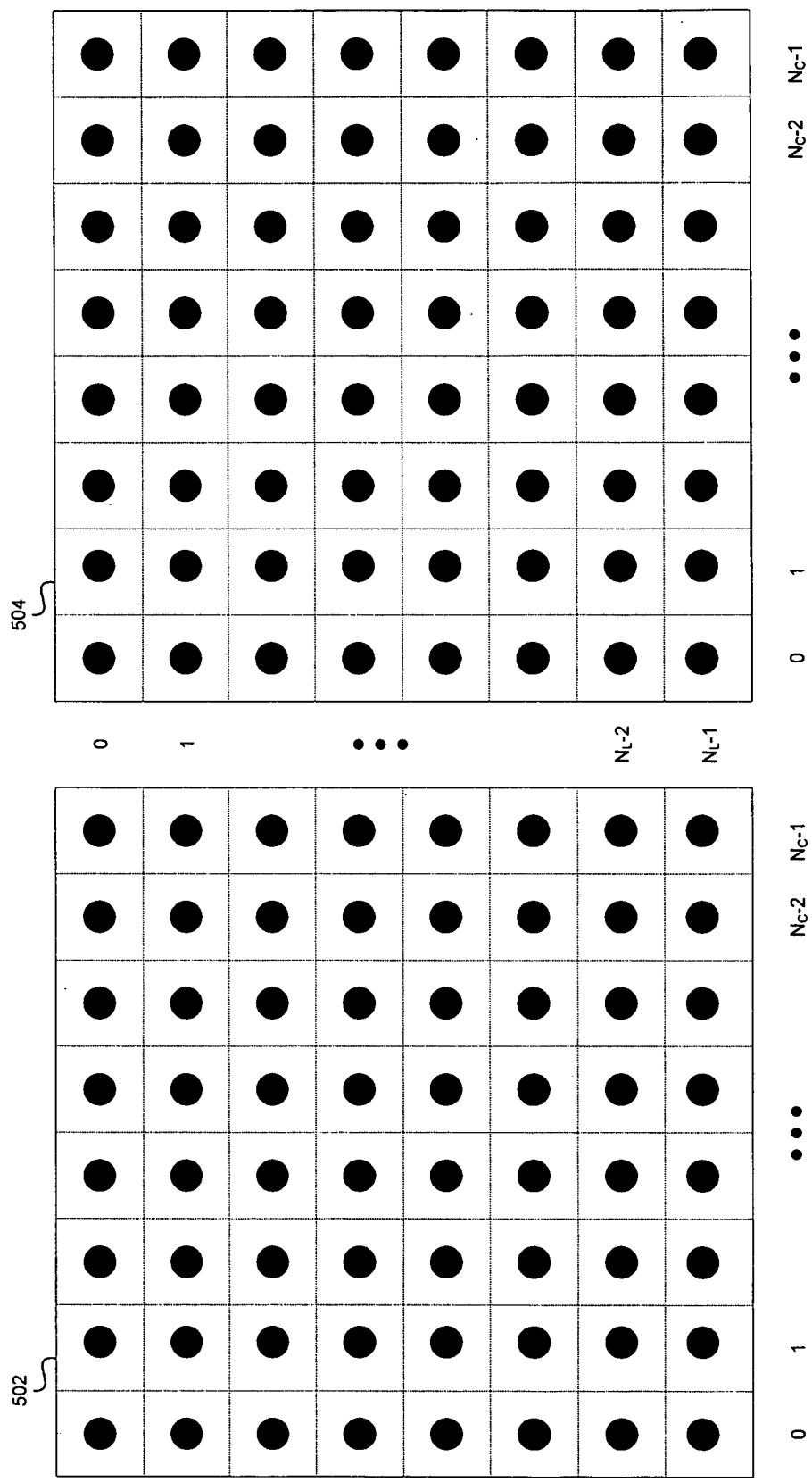
FIG. 4 is an exemplary illustration of luma and chroma samples taken for pixels located within an $N_R \times N_C$ pixel neighborhood within a video picture with 4:4:4 chroma sub-sampling, in connection with an embodiment of the invention.

FIG. 4 is an exemplary illustration of luma and chroma samples taken for pixels located within an $N_R \times N_C$ pixel neighborhood within a video picture with 4:4:4 chroma subsampling, in connection with an embodiment of the invention. Referring to FIG. 4, there is shown a plurality of luma samples 502, and a plurality of chroma samples 504. The pixel neighborhood comprises pixels arranged in $N_R$ rows comprising $N_C$ pixels in each row. The rows may be numbered 0, 1 ... $N_R-2$, $N_R-1$ and the columns may be numbered 0, 1 ... $N_C-2$, $N_C-1$. The plurality of luma samples 502 indicates that a luma sample may be taken for each pixel in the pixel neighborhood. The plurality of chroma samples 504 indicate that a Cb and Cr sample maybe taken for each pixel in the pixel neighborhood. Consequently, when computing the motion metrics $MM_{luma}$, $MM_{Cb}$, or $MM_{Cr}$ in equation [2] the values H=h=$N_R$ and W=w=$N_C$ may be utilized.

Figure 5:
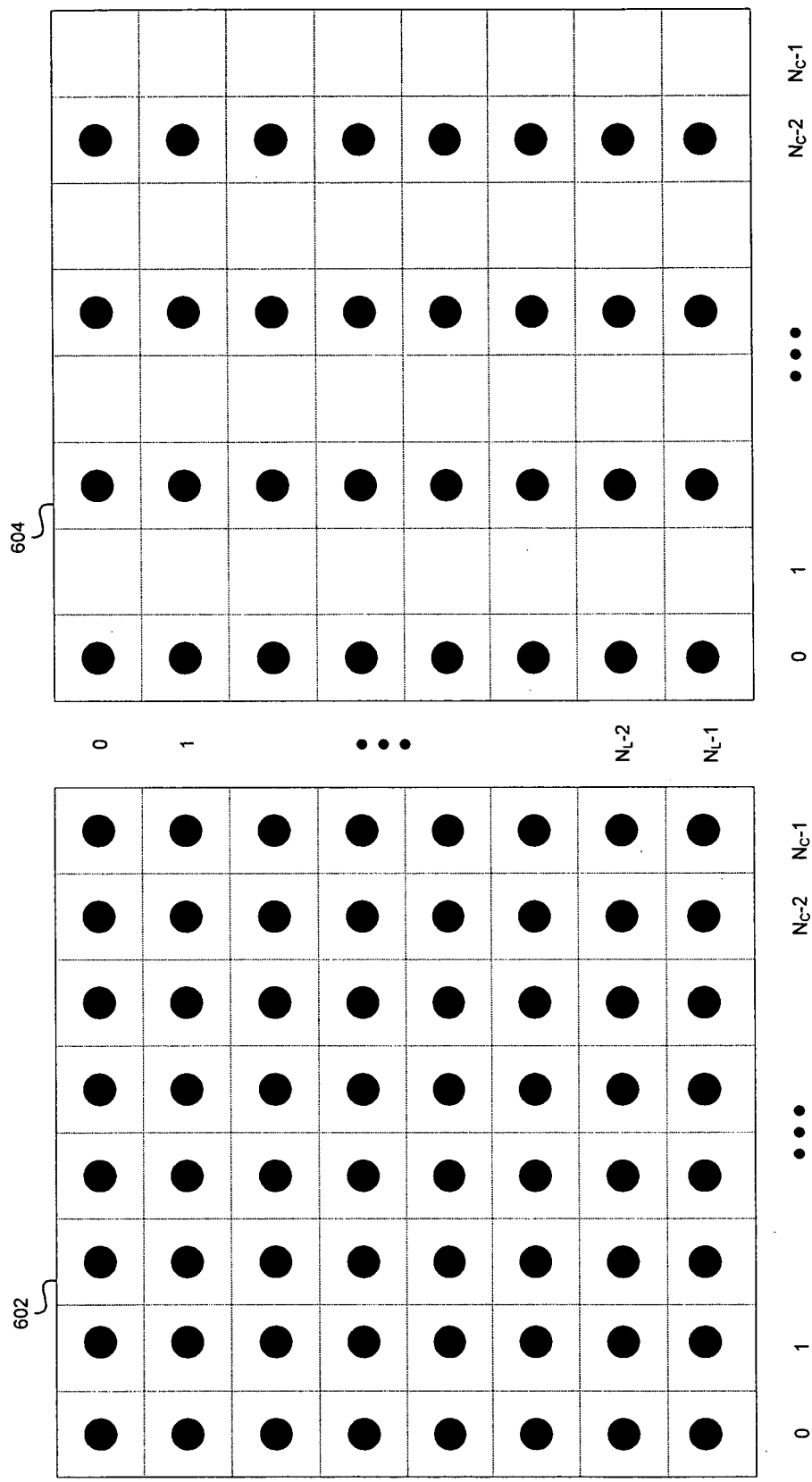
FIG. 5 is an exemplary illustration of luma and chroma samples taken for pixels located within an $N_R \times N_C$ pixel neighborhood within a video picture with 4:2:2 chroma sub-sampling, in connection with an embodiment of the invention.

FIG. 5 is an exemplary illustration of luma and chroma samples taken for pixels located within an $N_R \times N_C$ pixel neighborhood within a video picture with 4:2:2 chroma subsampling, in connection with an embodiment of the invention. Referring to FIG. 5, there is shown a plurality of luma samples 602, and a plurality of chroma samples 604. The pixel neighborhood comprises pixels arranged in $N_R$ rows comprising $N_C$ pixels in each row. The rows may be numbered 0, 1 ... $N_R-2$, $N_R-1$ and the columns may be numbered 0, 1 ... $N_C-2$, $N_C-1$. The plurality of luma samples 602 indicates that a luma sample may be taken for each pixel in the pixel neighborhood. The plurality of chroma samples 604 indicate that a Cb and Cr sample maybe taken for every other pixel for each line in the pixel neighborhood. Consequently, when computing the motion metric $MM_{luma}$, in equation [2] the values H=h=$N_R$ and W=w=$N_C$ may be utilized. However, when computing the motion metrics $MM_{Cb}$, or $MM_{Cr}$ in equation [2] the values H=h=$N_R$ and W=$N_C$ may be utilized. The value w=$N_C/2$ or w=($N_C+1$)/2 may be utilized.

Figure 6:
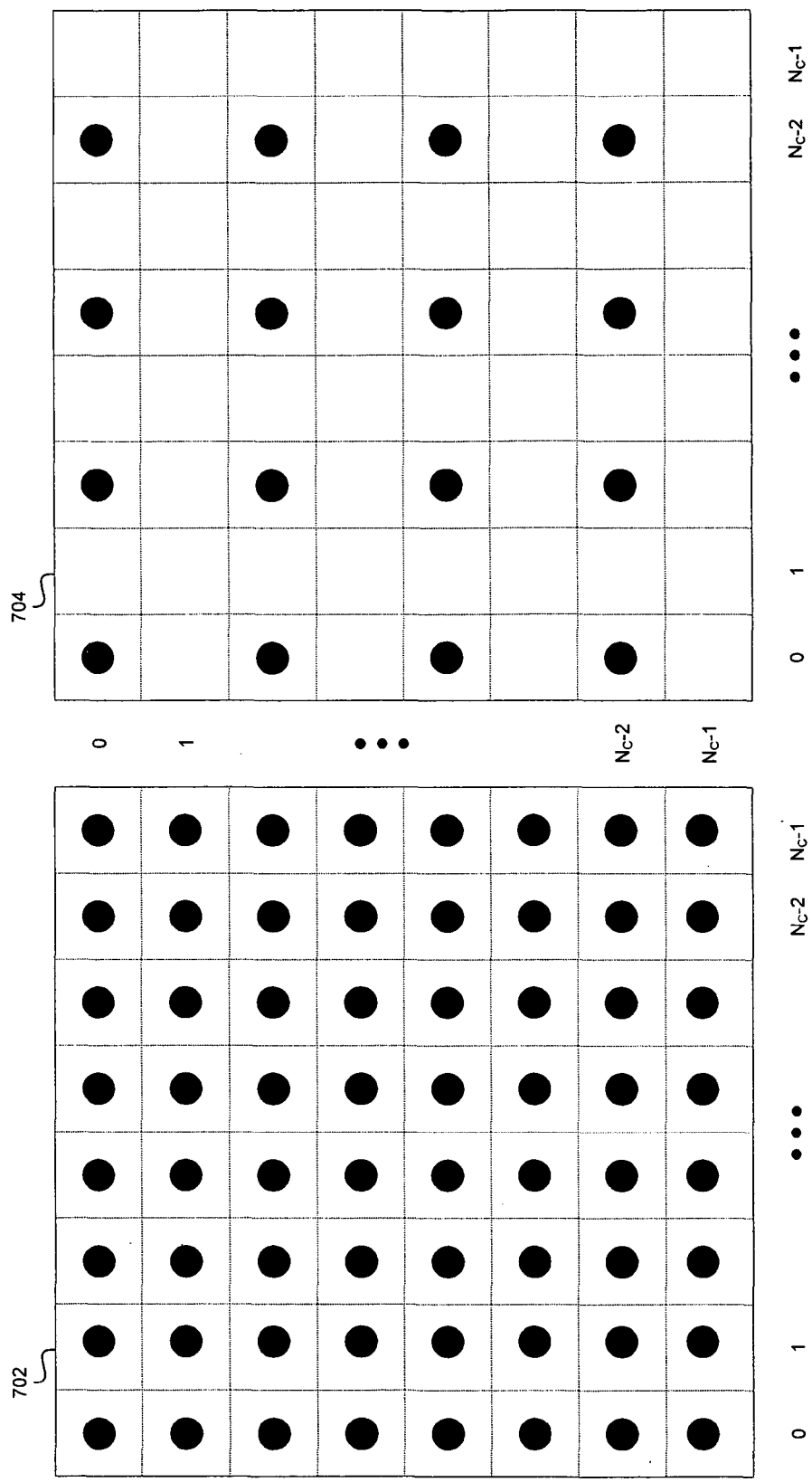
FIG. 6 is an exemplary illustration of luma and chroma samples taken for pixels located within an $N_R \times N_C$ pixel neighborhood within a video picture with 4:2:0 chroma sub-sampling, in connection with an embodiment of the invention.

FIG. 6 is an exemplary illustration of luma and chroma samples taken for pixels located within an $N_R \times N_C$ pixel neighborhood within a video picture with 4:2:0 chroma subsampling, in connection with an embodiment of the invention. Referring to FIG. 6, there is shown a plurality of luma samples 702, and a plurality of chroma samples 704. The pixel neighborhood comprises pixels arranged in $N_R$ rows comprising $N_C$ pixels in each row. The rows may be numbered 0, 1 ... $N_R-2$, $N_R-1$ and the columns may be numbered 0, 1 ... $N_C-2$, $N_C-1$. The plurality of luma samples 702 indicates that a luma sample may be taken for each pixel in the pixel neighborhood. The plurality of chroma samples 704 indicates that a Cb and Cr sample maybe taken for every other pixel in a line and for every other line in the pixel neighborhood. Consequently, when computing the motion metric $MM_{luma}$, in equation [2] the values $H=h=N_R$ and $W=w=N_C$ may be utilized. However, when computing the motion metrics $MM_{Cb}$, or $MM_{Cr}$, in equation [2] the values $H=N_R$ and $W=N_C$ may be utilized. The values $h=N_R/2$ or $h=(N_R+1)/2$, and $w=N_C/2$ or $w=(N_C+1)/2$ may be utilized.

In various embodiments of the invention, an FIR blending factor $\alpha_{FIR}$ may be computed by the MM calculation block 412 based on the corresponding FIR MM, $MM_{FIR}$, based on a nonlinear relationship, such as represented in the following expression, for example:

$$\begin{cases} \alpha_{FIR} = 0 & \text{for } MM_{FIR} \leq \sqrt{K_{1,FIR}} \\ \alpha_{FIR} = K_{0,FIR}\left(1 - \dfrac{K_{1,FIR}}{MM_{FIR}^2}\right) & \text{for } \sqrt{\dfrac{K_{0,FIR} K_{1,FIR}}{K_{0,FIR}-1}} > MM_{FIR} > \sqrt{K_{1,FIR}} \\ \alpha_{FIR} = 1 & \text{for } MM_{FIR} \geq \sqrt{\dfrac{K_{0,FIR} K_{1,FIR}}{K_{0,FIR}-1}} \end{cases}$$ equation [5]

where $K_{0,FIR}$ and $K_{1,FIR}$ may represent constants that may be stored in the registers 110 in FIG. 1, for example.

The FIR NR block 414 may comprise suitable logic, circuitry, and/or code that may be adapted to generate an FIR filtered video picture. A value of a pixel located at (x,y) in the FIR filtered video picture, $P_{n,FIR}(x,y)$, may be generated based on a value of a corresponding pixel in a current video picture 204, $P_n(x,y)$, of a corresponding pixel in a preceding video picture 206, $P_{n-1}(x,y)$, and of a corresponding pixel in a subsequent video picture 202, $P_{n+1}(x,y)$. The FIR NR block 414 may be adapted to perform, for example, a 3-tap FIR filtering operation given by the expression:

$$P_{n,FIR}(x,y)=c_0 P_{n-1}(x,y)+c_1 P_n(x,y)+c_2 P_{n+1}(x,y) \quad \text{equation [6]}$$

where $c_0$, $c_1$, and $c_2$ may represent FIR filter coefficients. In this regard, the FIR filter coefficients may be stored in the registers 110 in FIG. 1, for example. The FIR NR block 414 may be adapted to generate an FIR-blended video picture. A value of a pixel located at (x,y) in a current FIR blended video picture, $P_{n,OUT\_FIR}(x,y)$, may be based on an adjusted value of a corresponding pixel located at (x,y) in the current video picture, $P_n(x,y)$, according to, for example, the following expression:

$$P_{n,OUT\_FIR}(x,y)=\alpha_{FIR} P_n(x,y)+(1-\alpha_{FIR})P_{n,FIR}(x,y) \quad \text{equation [7]}$$

where $\alpha_{FIR}$ may represent the FIR blending factor generated by the MM calculation block 412, and $P_{n,FIR}(x,y)$ may represent an FIR filtered pixel value as calculated in equation [6].

The amount of adjustment in the pixel value $P_n(x,y)$ that may be reflected in the corresponding FIR blended pixel $P_{n,OUT\_FIR}(x,y)$ may be based on the FIR blending factor $\alpha_{FIR}$, and on the pixel value of the corresponding FIR filtered pixel $P_{n,FIR}(x,y)$. For larger values of the FIR blending factor there may be less adjustment than may be derived for smaller values of the FIR blending factor. Based on equation [2], larger amounts of detected motion among a sequence of video pictures 202, 204 and/or 206 may be reflected in larger values for the corresponding motion metric value. Based on equation [5], larger MM values may be reflected in larger values for the corresponding FIR blending factor. The value $\alpha_{FIR}$ may increase or decrease nonlinearly in response to corresponding increases or decreases in the value $MM_{FIR}$. Therefore, larger amounts of detected motion may result in less blending according to equation [7].

Figure 7:
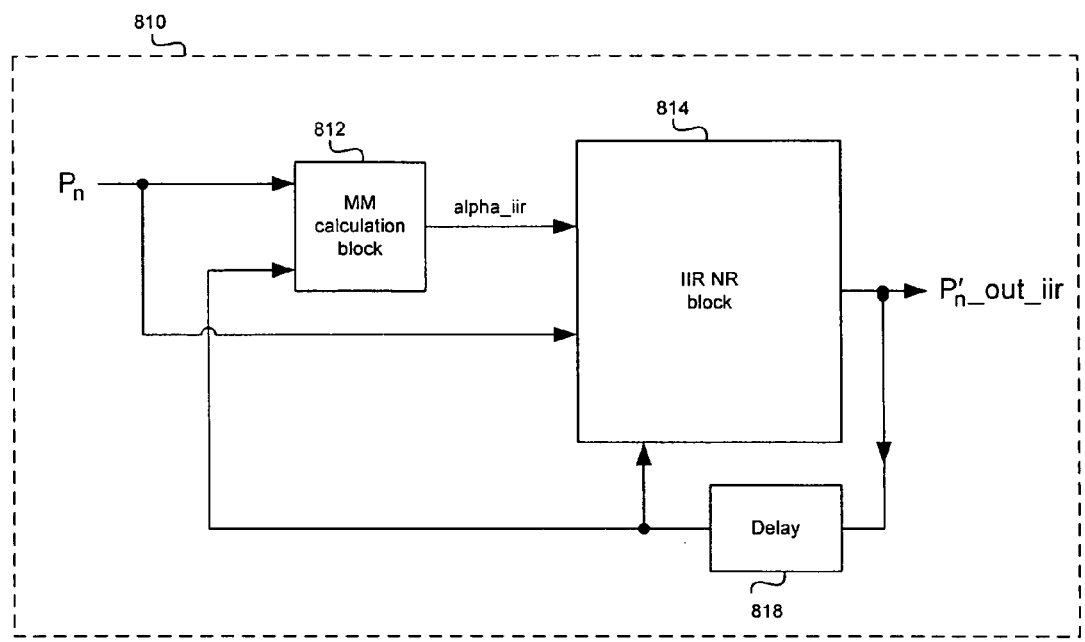
FIG. 7 is a block diagram of an exemplary infinite impulse response (IIR) blending system operating in IIR noise reduction mode, in accordance with an embodiment of the invention.

FIG. 7 is a block diagram of an exemplary infinite impulse response (IIR) blending system operating in IIR noise reduction mode, in accordance with an embodiment of the invention. Referring to FIG. 7 there is shown an IIR blending system 810 that may comprise a motion metric (MM) calculation block 812, an IIR noise reduction (IIR NR) block 814 and a delay block 818. The IIR blending system 810 may be referred to as a motion adaptive IIR NR mode system. The IIR blending system 810 may be implemented as a portion of the video processing block 102 in FIG. 1, for example. The delay block 818 may comprise suitable logic, circuitry and/or code that may be adapted to receive an output signal at a current time instant, and output the received output signal at a subsequent time instant. The MM calculation block 812 may comprise suitable logic, circuitry, and/or code that may be adapted to calculate an IIR MM. The MM calculation block 812 may utilize the calculated IIR MM to compute an IIR blending factor, $\alpha^{IIR}$.

The MM calculation block 812 may compute an IIR MM. For example, an IIR MM based on pixel values P may be computed in accordance with the following expression:

$$MM(x,y) = \frac{1}{h \cdot w} \sum_{i=-\frac{H-1}{2}}^{\frac{H-1}{2}} \sum_{j=-\frac{W-1}{2}}^{\frac{W-1}{2}} |P_n(i+x, j+y) - P'_{n-1}(i+x, j+y)|$$ equation [8]

where the tuple (x,y) may define the neighborhood of the corresponding transform window, MM(x,y) may represent the motion metric computed at the neighborhood, w may represent a number of pixels in a row within the transform window, h may represent a number of pixels in a column within the transform window, H may represent the number of rows in the neighborhood, W may represent the number of pixels in a row in the neighborhood, and the indexes i and j may represent pixel offsets in the vertical and horizontal directions, respectively, relative to the pixel located at (x, y). $P_n(i+x,j+y)$ may represent a value of a pixel located at (i+x, j+y) in a current video picture 204, and $P'_{n-1}(i+x,j+y)$ may represent a value of a corresponding pixel located at (i+x,j+y) in a preceding IIR blended video picture. The pixel value $P'_{n-1}$ may represent feedback output. The feedback output may comprise a version of output from the IIR NR block 814 that was time delayed by the delay block 818. The feedback output may be based on one or more preceding video pictures 206. The current video picture, and preceding IIR video picture may be of the same type in equation [8].

A pixel value P may represent a luma pixel value, a Cb or color difference B−Y pixel value, or a Cr or color difference R−Y pixel value. In each case a corresponding $MM_{luma}$, $MM_{Cb}$, or $MM_{Cr}$ may be computed. A final motion metric may be computed based on a weighted average sum of the respective motion metrics. For example, for an IIR NR mode, an $MM_{IIR}$ may be computed by the MM calculation block 812 according to the following expression:

$$MM_{IIR} = c_0 MM_{luma} + c_1 MM_{Cb} + c_2 MM_{Cr} \quad \text{equation [9]}$$

and $$c_0 + c_1 + c_2 = 1 \quad \text{equation [10]}$$

where $c_0$, $c_1$, and $c_2$ may represent constants that may be stored in the registers 110 in FIG. 1, for example.

In various embodiments of the invention, an IIR blending factor $\alpha_{IIR}$ may be computed by the MM calculation block 812 based on the corresponding IIR MM, $MM_{IIR}$, based on a nonlinear relationship, such as represented in the following expression, for example:

$$\begin{cases} \alpha_{IIR} = 0 & \text{for } MM_{IIR} \leq \sqrt{K_{1,IIR}} \\ \alpha_{IIR} = K_{0,IIR}\left(1 - \frac{K_{1,IIR}}{MM_{IIR}^2}\right) & \text{for } \sqrt{\frac{K_{0,IIR} K_{1,IIR}}{K_{0,IIR} - 1}} > MM_{IIR} > \sqrt{K_{1,IIR}} \\ \alpha_{IIR} = 1 & \text{for } MM_{IIR} \geq \sqrt{\frac{K_{0,IIR} K_{1,IIR}}{K_{0,IIR} - 1}} \end{cases}$$

equation [11]

where $K_{0,IIR}$ and $K_{1,IIR}$ may represent constants that may be stored in the registers 110 in FIG. 1, for example.

The IIR NR block 814 may comprise suitable logic, circuitry, and/or code that may be adapted to generate an IIR blended video picture. A value of a pixel located at (x,y) in the IIR blended video picture, $P_{n,OUT\_IIR}(x,y)$, may be generated based on a value of a corresponding pixel in a current video picture 204, $P_n(x,y)$, and of a corresponding pixel in a preceding IIR blended video picture $P'_{n-1}(x,y)$. A value of a pixel located at (x,y) in a current IIR blended video picture, $P_{n,OUT\_IIR}(x,y)$, may be based on an adjusted value of a corresponding pixel located at (x,y) in the current video picture, $P_n(x,y)$, according to, for example, the following expression:

$$P_{n,OUT\_IIR}(x,y) = \alpha_{IIR} P_n(x,y) + (1 - \alpha_{IIR}) P'_{n-1}(x,y) \quad \text{equation [12]}$$

where $\alpha_{IIR}$ may represent the IIR blending factor generated by the MM calculation block 812, and $P'_{n-1}(x,y)$ may represent the time delayed feedback output from the IIR NR block 814.

The amount of adjustment in the pixel value $P_n(x,y)$ that may be reflected in the corresponding IIR blended pixel $P_{n,OUT\_IIR}(x,y)$ may be based on the IIR blending factor $\alpha_{IIR}$, and on the pixel value of the corresponding preceding IIR blended pixel $P'_{n-1}(x,y)$.

Figure 8:
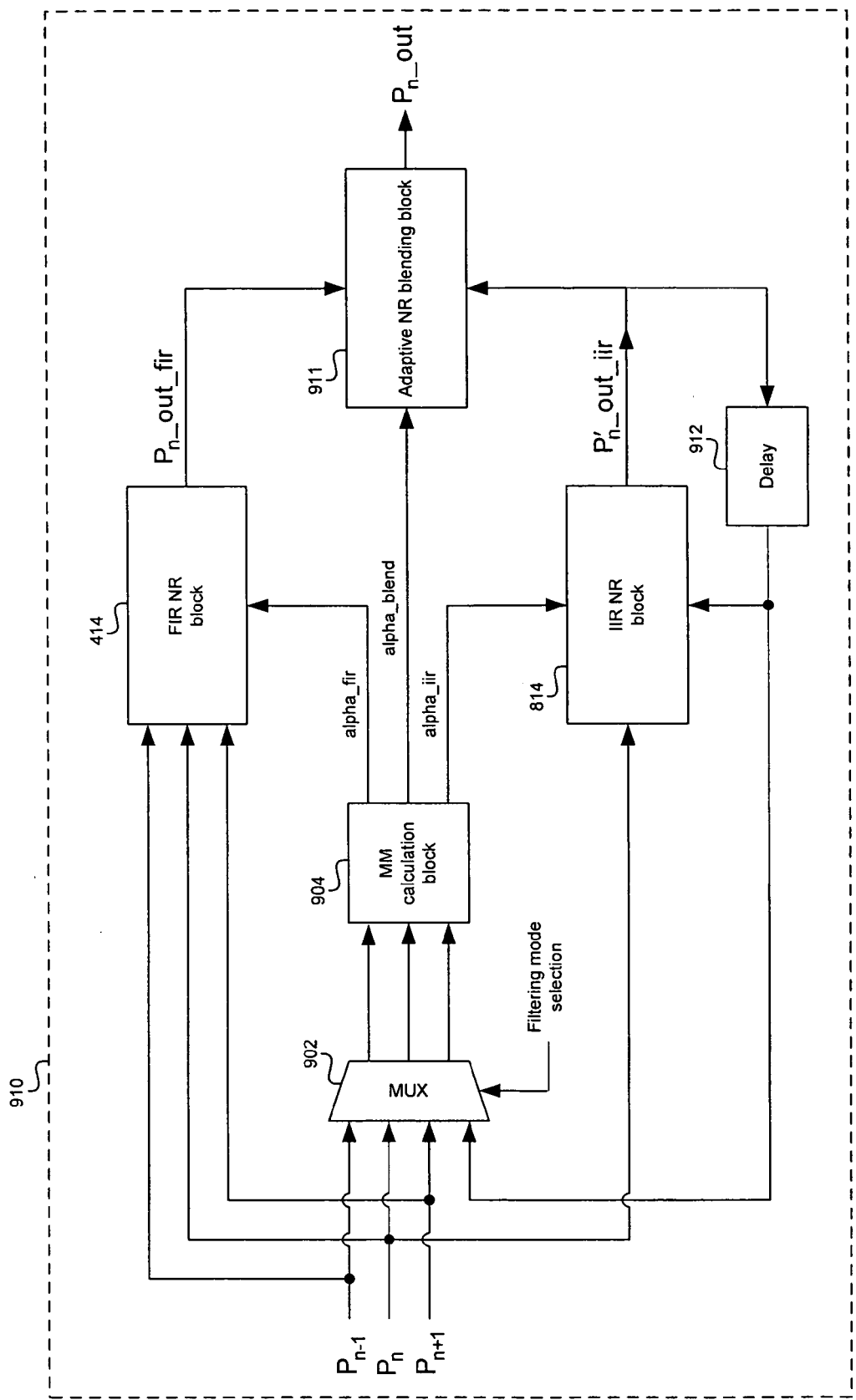
FIG. 8 is a block diagram of an exemplary adaptive blending system operating in adaptive noise reduction mode, in accordance with an embodiment of the invention.

FIG. 8 is a block diagram of an exemplary adaptive blending system operating in adaptive noise reduction mode, in accordance with an embodiment of the invention. Referring to FIG. 8, there is shown an adaptive blending system 910. The adaptive blending system 910 may comprise a multiplexer (MUX) 902, an MM calculation block 904, an FIR NR block 414, an IIR NR block 814, an adaptive NR blending block 911, and a delay block 912. The adaptive blending system 910 may be implemented as a portion of the video processing block 102 in FIG. 1, for example.

The MUX 902 may comprise suitable logic, circuitry, and/or code that may be adapted to select inputs to the MM calculation block 904 in accordance with an NR mode, for example an FIR NR mode, IIR NR mode, and/or adaptive NR mode. The MUX 902 may be adapted to select at least one value of a pixel from a preceding video picture, $P_{n-1}$, at least one value of a corresponding pixel from a current video picture, $P_n$, and at least one value of a corresponding pixel from a subsequent video picture, $P_{n+1}$, when an FIR NR mode is selected. The MUX 902 may be adapted to select at least one value of a pixel from the current video picture, $P_n$, and at least one value of a corresponding pixel from a preceding IIR blended video picture, $P'_{n-1}$, when an IIR NR mode is selected. When an adaptive NR mode is selected, the MUX 902 may be adapted to first select at least one value of a corresponding pixel from a current video picture, $P_n$, at least one value of a corresponding pixel from a subsequent video picture, $P_{n+1}$, and at least one value of a corresponding pixel from a preceding IIR blended video picture, $P'_{n-1}$.

The delay block 912 may comprise suitable logic, circuitry and/or code that may be adapted to receive an output signal at a current time instant, and output the received output signal at a subsequent time instant.

The MM calculation block 904 may comprise suitable logic, circuitry, and/or code that may be adapted to calculate an adaptive MM. The MM calculation block 904 may utilize the calculated adaptive MM to compute an adaptive blending factor, $\alpha_{BLEND}$.

The MM calculation block 904 may compute an adaptive MM. For example, an adaptive MM based on pixel values P may be computed in accordance with the following expression:

$$MM(x,y) = \frac{1}{h \cdot w} \sum_{i=-\frac{H-1}{2}}^{\frac{H-1}{2}} \sum_{j=-\frac{W-1}{2}}^{\frac{W-1}{2}} [|P_n(i+x, j+y) - P'_{n-1}(i+x, j+y)| + |P_n(i+x, j+y) - P_{n+1}(i+x, j+y)|]$$

equation [13]

where the tuple (x,y) may define the neighborhood of the corresponding transform window, MM(x,y) may represent the motion metric computed at the neighborhood, w may represent a number of pixels in a row within the transform window, h may represent a number of pixels in a column within the transform window, H may represent a number of rows in the neighborhood, W may represent a number of pixels in a row in the neighborhood, and the indexes i and j may represent pixel offsets in the vertical and horizontal directions, respectively, relative to the pixel located at (x, y). $P_n(i+x,j+y)$ may represent a value of a pixel located at (i+x, j+y) in a current video picture 204, $P_{n+1}(i+x,j+y)$ may represent a value of a pixel located at (i+x,j+y) in a subsequent video picture 202, and $P'_{n-1}(i+x,j+y)$ may represent a value of a corresponding pixel located at (i+x,j+y) in a preceding IIR blended video picture. The pixel value $P'_{n-1}$ may represent feedback output. The feedback output may comprise a version of output from the IIR NR block 814 that was time delayed by the delay block 912. The feedback output may be based on one or more preceding video pictures 206. The current video picture, subsequent video picture and preceding IIR video picture may be of the same type in equation [13].

A pixel value P may represent a luma pixel value, a Cb or color difference B-Y pixel value, or a Cr or color difference R-Y pixel value. In each case a corresponding $MM_{luma}$, $MM_{Cb}$, or $MM_{Cr}$ may be computed. A final motion metric may be computed based on a weighted average sum of the respective motion metrics. For example, for an adaptive NR mode, an $MM_{BLEND}$ may be computed by the MM calculation block 904 according to the following expression:

$$MM_{BLEND} = c_0 MM_{luma} + c_1 MM_{Cb} + c_2 MM_{Cr} \quad \text{equation [14]}$$

and $$c_0 + c_1 + c_2 = 1 \quad \text{equation [15]}$$

where $c_0$, $c_1$, and $C_2$ may represent constants that may be stored in the registers 110 in FIG. 1, for example.

In various embodiments of the invention, an adaptive blending factor $\alpha_{BLEND}$ may be computed by the MM calculation block 904 based on the corresponding adaptive MM, $MM_{BLEND}$, based on a nonlinear relationship, such as represented in the following expression, for example:

$$\begin{cases} \alpha_{BLEND} = 0 & \text{for } MM_{BLEND} \leq \sqrt{K_{1,BLEND}} \\ \alpha_{BLEND} = K_{0,BLEND}\left(1 - \frac{K_{1,BLEND}}{MM_{BLEND}^2}\right) & \text{for } \sqrt{\frac{K_{0,BLEND} K_{1,BLEND}}{K_{0,BLEND} - 1}} > MM_{BLEND} > \sqrt{K_{1,BLEND}} \\ \alpha_{BLEND} = 1 & \text{for } MM_{BLEND} \geq \sqrt{\frac{K_{0,IIR} K_{1,IIR}}{K_{0,IIR} - 1}} \end{cases} \quad \text{equation [16]}$$

where $K_{0,BLEND}$ and $K_{1,BLEND}$ may represent constants that may be stored in the registers 110 in FIG. 1, for example.

The adaptive NR blending block 911 may comprise suitable logic, circuitry, and/or code that may be adapted to generate an adaptive blended video picture. A value of a pixel located at (x,y) in a current adaptive blended video picture, $P_{n,OUT}(x,y)$, may be generated based on a value of a corresponding pixel in a current FIR blended video picture, $P_{n,OUT\_FIR}(x,y)$, and of a corresponding pixel in a current IIR blended video picture $P_{n,OUT\_IIR}(x,y)$. A value of a pixel located at (x,y) in a current adaptive blended video picture, $P_{n,OUT}(x,y)$, may be based on a value of a corresponding pixel located at (x,y) in the current FIR blended video picture, $P_{n,OUT\_FIR}(x,y)$, and in the current IIR blended video picture $P_{n,OUT\_IIR}(x,y)$ according to, for example, the following expression:

$$P_{n,OUT}(x,y) = \alpha_{BLEND} P_{n,OUT\_FIR}(x,y) + (1-\alpha_{BLEND}) P_{n,OUT\_IIR}(x,y) \quad \text{equation [17]}$$

where $\alpha_{BLEND}$ may represent the adaptive blending factor generated by the MM calculation block 904.

For larger values of the adaptive blending factor, a value of a pixel in the adaptive blended video picture may be approximately equal to a value of a corresponding pixel in the FIR blended video picture. For smaller values of the adaptive blending factor, a value of a pixel in the adaptive blended video picture may be approximately equal to a value of a corresponding pixel in the IIR blended video picture.

In various embodiments of the invention, the adaptive blending factor may control the contributions of the FIR blended video picture and the IIR blended video picture to the output adaptive blended video picture. When a larger amount of motion is detected among a sequence of video pictures 202, 204 and/or 206 the blended video picture may reflect a correspondingly larger contribution from the FIR blended video picture. When a comparatively small amount of motion is detected, the output adaptive blended video picture may reflect a correspondingly larger contribution from the IIR blended video picture.

In one aspect of the invention, an objective may be to reduce an amount of noise where the corresponding profile of the noise approximates a Gaussian distribution. For example, the distribution of values of the absolute difference quantities reflected in equations [2], [8] and [13] may approximate a Gaussian distribution based on the central limit theorem, and with a more concentrated standard deviation. As a result, the blending factors, as reflected in equations [5], [11] and [16] may respond more quickly to detected motion and more effectively reduce noise in output video pictures than may be the case with some conventional NR algorithms. For example, when the value of one of the blending factors $\alpha_{FIR}$, $\alpha_{IIR}$, and/or $\alpha_{BLEND}$, approaches a value about equal to 1, the effect would be to let the original pixel value or the FIR blended pixel value dominate the contribution to the corresponding output blended pixel value. Pixels associated with a value of the motion metric MM that is less than or equal to the sum of the MM expectation value and the quantity $3*\sigma_n$ may include more than 99.9% of the noisy pixels, where $\sigma_n$ may represent the standard deviation of the random variable MM. The non-linear mapping functions that relate the motion metric MM and the corresponding blending factors $\alpha_{FIR}$, $\alpha_{IIR}$, and/or $\alpha_{BLEND}$, may be designed so that a value of the blending factor is about equal to 1 when the value of MM at least about equal to the sum of the MM expectation value and $3*\sigma_n$, to achieve NR for the majority of noisy pixels and to avoid unnecessary filtering for video content.

Figure 9:
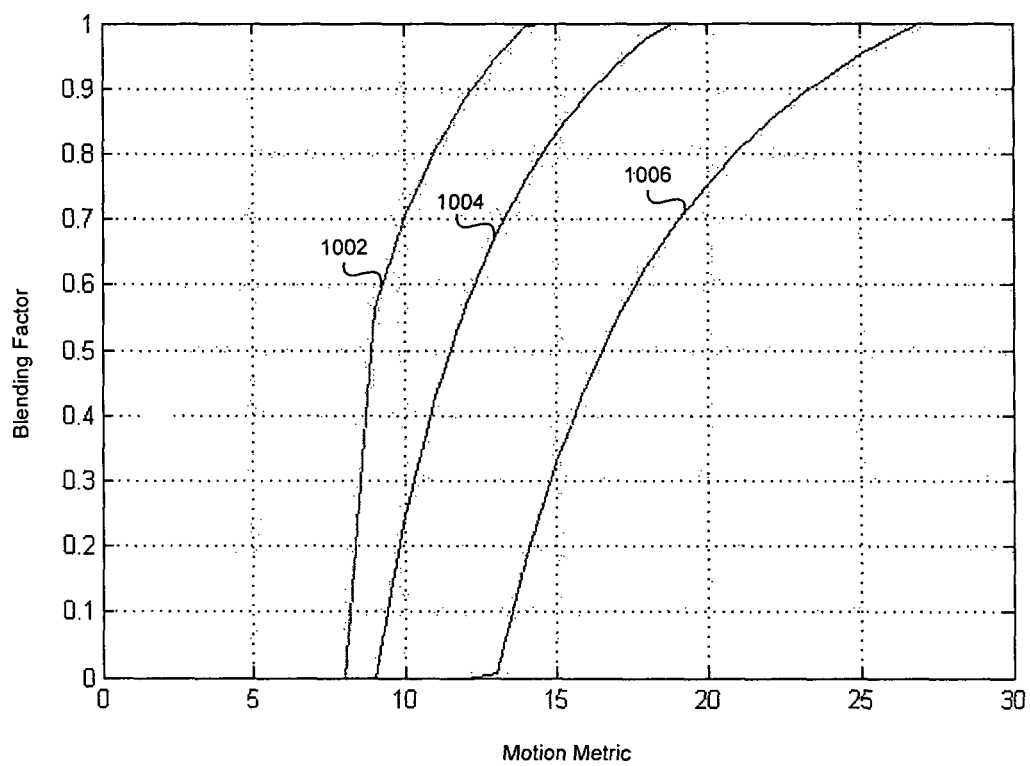
FIG. 9 is an exemplary graph illustrating blending factor values and corresponding motion metric values, in accordance with an embodiment of the invention.

FIG. 9 is an exemplary graph illustrating blending factor values and corresponding motion metric values, in accordance with an embodiment of the invention. Referring to FIG. 9, there is shown a graph of adaptive blending factor values 1002, a graph of IIR blending factor values 1004 and a graph of FIR blending factor values 1006. The adaptive blending factor graph 1002 may reflect values for the constants $K_{0,BLEND}=1.3$ and $K_{1,BLEND}=46$. The IIR blending factor graph 1004 may reflect values for the constants $K_{0,BLEND}=1.3$ and $K_{1,BLEND}=81$. The FIR blending factor graph 1002 may reflect values for the constants $K_{0,BLEND}=1.3$ and $K_{1,BLEND}=168$. Because of the nonlinearity in the relationship between the blending factors and the motion metric, as reflected in graphs 1002, 1004 and/or 1006, for small values of $\alpha_{FIR}$, $\alpha_{FIR}$, or $\alpha_{FIR}$, the values of the blending factors may vary quickly with changes in values of the motion metric in comparison to some conventional NR algorithms in which the value of the blending factor may be linearly proportional to the motion metric value. As a result, in various embodiments of the invention output video pictures may be generated while avoiding the displaying of artifacts that may reduce video quality for moving objects. Examples of such artifacts may be observed in the display as motion blurriness or motion trails in sequences of video pictures.

Figure 10:
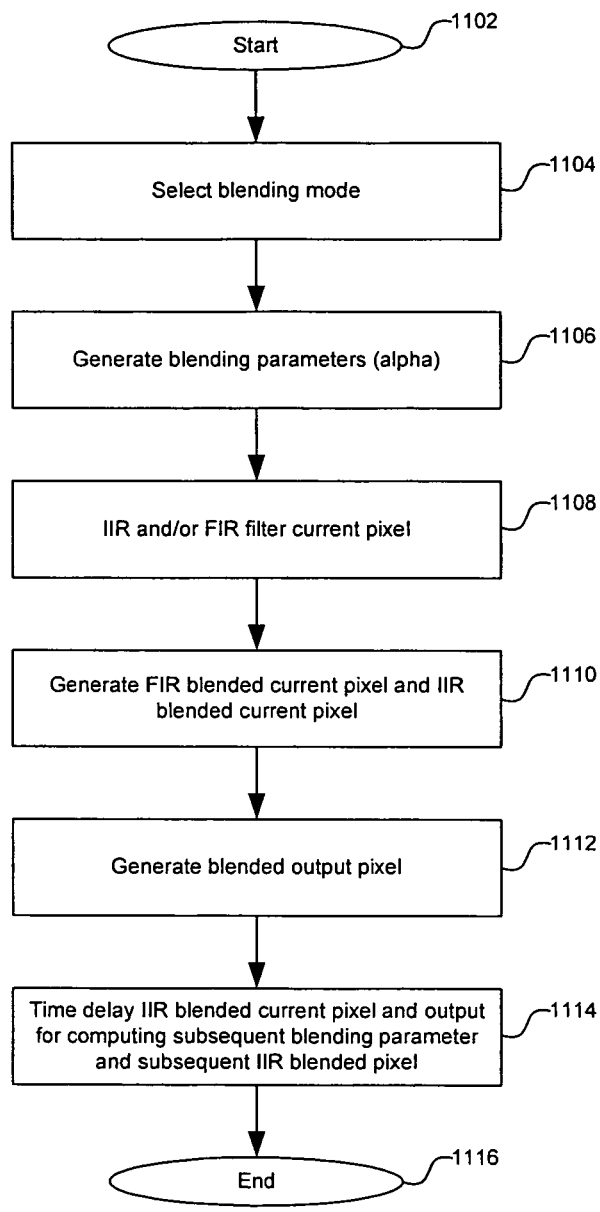
FIG. 10 is a flow diagram with exemplary steps illustrating the operation of a motion adaptive noise reduction system, in accordance with an embodiment of the invention.

FIG. 10 is a flow diagram with exemplary steps illustrating the operation of a motion adaptive noise reduction system, in accordance with an embodiment of the invention. Referring to FIG. 10, in step 1104, after start step 1102, the processor 104 in FIG. 1 may select a filtering mode of operation. The processor 104 may select between an FIR blending mode, an IIR blending mode, and an adaptive blending mode. The selected blending mode may be utilized to control the operation of the MUX 902 in FIG. 8, for example.

In step 1106, the MM calculation block 904 may utilize the pixel information received from the MUX 902 to generate the appropriate MM parameter in accordance with the selected filtering mode. The MM calculation block 904 may generate the appropriate blending factors based on the generated MM parameter. In step 1108, the FIR NR block 414 may FIR filter the current pixel, $P_n$, based on filter coefficients provided from the registers 110 in FIG. 1 and the values of the previous collocated pixel, $P_{n-1}$, and the next collocated pixel, $P_{n+}$. The IIR NR block 814 may IIR filter the current pixel, $P_n$, by recursive feedback of the IIR-filtered previous collocated pixel, $P'_{n-1}$. In step 1110, the FIR NR block 414 may generate an FIR blended current pixel, and the IIR NR block 814 may generate an IIR-blended current pixel.

In step 1112, the adaptive NR blending block 911 may generate a filtered output pixel by blending the FIR-blended current pixel from the FIR NR block 414 and the IIR-blended current pixel from the IIR NR block 814 based on the adaptive blending factor. In step 1114, the IIR-blended current pixel may be time delayed and utilized as input to compute a subsequent blending factor and/or subsequent IIR blended pixel. After step 1114, the process may proceed to the end step 1116.

Various embodiments of the invention may also be utilized for other video processing tasks, such as motion compensated temporal filtering (MCTF) noise reduction, de-interlacing, and 3D combing. In general, various embodiments of the invention may be utilized for video processing tasks that are based on spatial interpolation (SI) and/or temporal interpolation (TI). Aspects of the invention that may be utilized for TI video processing may include adjusting at least one value of a current pixel contained in a current video picture based the at least one value of the current pixel, and on at least one value of a corresponding pixel in at least one preceding video picture and/or at least one subsequent video picture. Aspects of the invention that may be utilized for Si video processing may include adjusting at least one value of a current pixel contained in a current video picture based the at least one value of the current pixel, and on at least one value of at least one other pixel in the current video picture. Aspects of the invention that may be utilized for generating at least one value of a current pixel contained in a current video picture by blending the two results from TI and SI.

Various embodiments of the invention are not limited to a nonlinear relationship between a blending factor and a corresponding motion metric as described in equations [5], [11] and/or [16]. An embodiment of the invention may utilize a logarithmic relationship between the blending factor and corresponding motion metric. For example, the value of the blending factor $\alpha$ may be a function of the value of $\log_r(MM)$, where $\log_r(x)$ may represent a base r logarithm of the value of x. An embodiment of the invention may utilize an exponential relationship between the blending factor and corresponding motion metric. For example, the value of $\alpha$ may be a function of $B^{k*MM}$, where the value B may represent a value such as 2.718, and k may be a complex number. The values of the blending factors may not be limited to a range between 0 and 1, but may be adapted to other value ranges according to the video processing task being performed. The method for computing the motion metric may not be limited to an average of absolute values of differences, as in equations [2], [8] and [13]. For example, an alternative method for computing MM values may utilize computing average square value of differences.

In various embodiments of the invention, the blending factors $\alpha_{FIR}$, $\alpha_{IIR}$, and/or $\alpha_{BLEND}$ may be computed based on the value of the motion metric as computed in equation [13]. For example, in the calculation of the value of the blending factor $\alpha_{FIR}$ in equation [5], the value of the motion metric $MM_{FIR}$ may be computed as described in equation [13]. For example, in the calculation of the value of the blending factor $\alpha_{IIR}$ in equation [11], the value of the motion metric $MM_{IIR}$ may be computed as described in equation [13]. This method may reduce computational requirements by computing a single value of the motion metric MM that may be utilized to compute a plurality of blending factors, for example, $\alpha_{FIR}$, $\alpha_{IIR}$, and/or $\alpha_{BLEND}$, for the adaptive blending NR mode.

Aspects of a system for processing images may comprise circuitry within a chip that computes a blending factor comprising a nonlinear relationship to a motion metric. The motion metric may define an amount of motion detected between a current video picture and one or more preceding video pictures and/or one or more subsequent video pictures. The circuitry within the chip may adjust at least one pixel in the current video picture based on the computed blending factor. A current video picture, any preceding video picture, and/or any subsequent video picture may comprise a video frame and/or a video field. A blending factor may be computed for a finite impulse response (FIR) noise reduction (NR) mode, an infinite impulse response (IIR) NR mode, and/or an adaptive blended NR mode. Consequently, the blending factor may be an FIR blending factor, an IIR blending factor, and/or an adaptive blending factor. Similarly a motion metric may be computed for a FIR NR mode, an IIR NR mode, and/or an adaptive blended NR mode. The circuitry within the chip may derive the adaptive blended NR mode based on an adaptive blending factor, the FIR NR mode, and/or the IIR NR mode. The adaptive blended NR mode may generate an output that is proportional to an output from the FIR NR mode and/or an output from the IIR NR mode. The proportionality factor may be based on the adaptive blending factor.

The circuitry within the chip may compute an FIR motion metric in FIR NR mode based on a sum that is computed over a plurality of proximately located pixels. At each pixel an absolute value of a difference in at least one pixel value of the current video picture and a corresponding at least one pixel value of at least one preceding video picture may be computed. To this absolute value may be added an absolute value of a difference in at least one pixel value of the current video picture and a corresponding at least one pixel value of at least one subsequent video picture. An IIR motion metric may be computed in IIR NR mode based on a sum that is computed over a plurality of proximately located pixels. At each pixel an absolute value of a difference in at least one pixel value of the current video picture and a corresponding at least one pixel value of feedback output comprising an IIR blended video picture. A pixel value may comprise a luminance value and/or at least one chroma value.

The circuitry within the chip may compute an adaptive motion metric in adaptive blended NR mode based on a sum that is computed over a plurality of proximately located pixels. At each pixel an absolute value of a difference in at least one pixel value of the current video picture and a corresponding at least one pixel value of feedback output comprising an IIR blended video picture may be computed. To this absolute value may be added an absolute value of a difference in at least one pixel value of the current video picture and a corresponding at least one pixel value of at least one subsequent video picture. The blending factor may be defined by the following expression:

$$\alpha = K_0\left(1 - \frac{K_1}{MM^2}\right)$$

where α may represent the blending factor, MM may represent the motion metric, and $K_0$ and $K_1$ may represent constant values.

The circuitry within the chip may compute the adjusted at least one pixel based on an adaptive blending factor and an FIR blended video picture and/or an IIR blended video picture. The FIR blended video picture may be computed based on an FIR blending factor and the current video picture, one or more preceding video pictures and/or one or more subsequent video pictures. The IIR blended video picture may be computed based on an IIR blending factor and the current video picture and/or feedback output comprising an IIR blended video picture. The feedback output may comprise a previously computed IIR blended video picture.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing images, the method comprising:
    performing by one or more processors, one or more circuits, or any combination thereof:
    computing a blending factor comprising a nonlinear relationship to a motion metric that defines an amount of motion between a current video picture and one or both of at least one preceding video picture and at least one subsequent video picture;
    computing said blending factor and said motion metric for one or more of a finite impulse response (FIR) noise reduction (NR) mode, an infinite impulse response (IIR) NR mode, and an adaptive blended NR mode; and
    adjusting at least one pixel in said current video picture based on said computed blending factor.

2. The method according to claim 1, comprising deriving said adaptive blended NR mode based on one or more of an adaptive blending factor, said FIR NR mode, and said IIR NR mode.

3. The method according to claim 1, comprising computing an FIR motion metric in FIR NR mode based on a sum computed by adding, over a plurality of proximately located pixels:
    an absolute value of a difference in at least one pixel value of said current video picture and a corresponding at least one pixel value of said at least one preceding video picture; and
    an absolute value of a difference in said at least one pixel value of said current video picture and a corresponding at least one pixel value of said at least one subsequent video picture.

4. The method according to claim 1, wherein said blending factor comprises an adaptive blending factor, an FIR blending factor, and an IIR blending factor.

5. The method according to claim 1, comprising computing an IIR motion metric in IIR NR mode, based on a sum computed by adding, over a plurality of proximately located pixels, an absolute value of a difference in at least one pixel value of said current video picture and a corresponding at least one pixel value of feedback output comprising an IIR blended video picture.

6. The method according to claim 1, comprising computing an adaptive motion metric in adaptive blended NR mode based on a sum, computed by adding, over a plurality of proximately located pixels:
    an absolute value of a difference in at least one pixel value of said current video picture and a corresponding at least one pixel value of feedback output comprising an IIR blended video picture; and
    an absolute value of a difference in said at least one pixel value of said current video picture and a corresponding at least one pixel value of said at least one subsequent video picture.

7. The method according to claim 1, wherein said blending factor is defined by the following expression:

$$\alpha = K_0\left(1 - \frac{K_1}{MM^2}\right)$$

where α represents said blending factor, MM represents said motion metric, and $K_0$ and $K_1$ represent constant values.

8. The method according to claim 1, comprising computing said adjusted at least one pixel based on an adaptive blending factor and one or both of an FIR blended video picture and an IIR blended video picture.

9. The method according to claim 8, comprising computing said FIR blended video picture based on an FIR blending factor and one or more of said current video picture, said at least one preceding video picture and said at least one subsequent video picture.

10. The method according to claim 8, comprising computing said IIR blended video picture based on an IIR blending factor and one or both of said current video picture and feedback output comprising said IIR blended video picture.

11. A system for processing images, the system comprising:
   circuitry within a chip that is operable to compute a blending factor comprising a nonlinear relationship to a motion metric that defines an amount of motion between a current video picture and one or both of at least one preceding video picture and at least one subsequent video picture; and
   said circuitry within said chip being operable to adjust at least one pixel in said current video picture based on said computed blending factor, wherein said circuitry within said chip is operable to compute said blending factor and said motion metric for one or more of a finite impulse response (FIR) noise reduction (NR) mode, an infinite impulse response (IIR) NR mode, and an adaptive blended NR mode.

12. The system according to claim 11, wherein said circuitry within said chip is operable to derive said adaptive blended NR mode based on one or more of an adaptive blending factor, said FIR NR mode, and said IIR NR mode.

13. The system according to claim 11, wherein said circuitry within said chip is operable to compute an FIR motion metric in FIR NR mode based on a sum computed by adding, over a plurality of proximately located pixels:
   an absolute value of a difference in at least one pixel value of said current video picture and a corresponding at least one pixel value of said at least one preceding video picture; and
   an absolute value of a difference in said at least one pixel value of said current video picture and a corresponding at least one pixel value of said at least one subsequent video picture.

14. The system according to claim 11, wherein said blending factor comprises an adaptive blending factor, an FIR blending factor, and an IIR blending factor.

15. The system according to claim 11, wherein said circuitry within said chip is operable to compute an IIR motion metric in IIR NR mode, based on a sum computed by adding, over a plurality of proximately located pixels, an absolute value of a difference in at least one pixel value of said current video picture and a corresponding at least one pixel value of feedback output comprising an IIR blended video picture.

16. The system according to claim 11, wherein said circuitry within said chip is operable to compute an adaptive motion metric in adaptive blended NR mode based on a sum, computed by adding, over a plurality of proximately located pixels:
   an absolute value of a difference in at least one pixel value of said current video picture and a corresponding at least one pixel value of feedback output comprising an IIR blended video picture; and
   an absolute value of a difference in said at least one pixel value of said current video picture and a corresponding at least one pixel value of said at least one subsequent video picture.

17. The system according to claim 11, wherein said blending factor is defined by the following expression:

$$\alpha = K_0\left(1 - \frac{K_1}{MM^2}\right)$$

where $\alpha$ represents said blending factor, MM represents said motion metric, and $K_0$ and $K_1$ represent constant values.

18. The system according to claim 11, wherein said circuitry within said chip is operable to compute said adjusted at least one pixel based on an adaptive blending factor and one or both of an FIR blended video picture and an IIR blended video picture.

19. The system according to claim 18, wherein said circuitry within said chip is operable to compute said FIR blended video picture based on an FIR blending factor and one or more of said current video picture, said at least one preceding video picture and said at least one subsequent video picture.

20. The system according to claim 18, wherein said circuitry within said chip is operable to compute said IIR blended video picture based on an IIR blending factor and one or both of said current video picture and feedback output comprising said IIR blended video picture.

* * * * *